United States Patent [19]

Ohtomo et al.

[11] 4,067,744

[45] Jan. 10, 1978

[54] ALKALI-RESISTANT GLASS COMPOSITION AND GLASS FIBERS MADE THEREFROM

[75] Inventors: Koichiro Ohtomo, Takatsuki; Takuji Yoshimura, Osaka, both of Japan

[73] Assignee: Kanebo, Ltd., Tokyo, Japan

[21] Appl. No.: 706,009

[22] Filed: July 16, 1976

[30] Foreign Application Priority Data

Dec. 30, 1975 Japan .................. 50-158774

[51] Int. Cl.$^2$ .................. C03C 13/00; C03C 3/08; C04B 31/06

[52] U.S. Cl. .................. 106/50; 106/54; 106/99

[58] Field of Search .................. 106/90, 50, 54, 52

[56] References Cited

U.S. PATENT DOCUMENTS

| 3,861,927 | 1/1975 | Kimura | 106/50 |
|---|---|---|---|
| 3,969,121 | 7/1976 | Atkinson | 106/99 |
| 3,973,974 | 8/1976 | Ohtomo et al | 106/99 |

*Primary Examiner*—Winston A. Douglas
*Assistant Examiner*—Mark Bell
*Attorney, Agent, or Firm*—Sherman & Shalloway

[57] ABSTRACT

An alkali resistant glass composition and alkali resistant glass fibers composed of said glass composition which comprises

| $SiO_2$ | 61 – 69 mole%, |
|---|---|
| $ZrO_2$ | 11.5 – 12.5 mole%, |
| CaO | 2 – 5 mole%, |
| $R_2O$ | 16 – 20 mole%, |
| $K_2O$ | 2 – 5 mole%, |
| $B_2O_3$ | 1 – 4 mole%, |
| $TiO_2$ | 0 – 0.3 mole%, and |
| $M_xO_y$ | 0 – 1 mole | wherein $R_2O$ represents the total amount of $Na_2O$ and $K_2O$; M is at least one metal selected from the group consisting of V, Cr, Mn, Fe, Co, Cu, Zn, As, Y, Mo, Cd, Sn, Sb, Hf and Ce; $x$ and $y$ are positive integers with the proviso that the valence of M multiplied by $x$ equals $2y$; and the content of fluorides, calculated as $F_2$, is 0 to 1 mole%, and meeting the following conditions, A. $R_2O + CaO \geq 19$ mole%,
B. $ZrO_2 + CaO + B_2O_3 \leq 18.5$ mole%, and
C. the molar ratio of $K_2O/CaO \geq 0.5$.

11 Claims, No Drawings

ALKALI-RESISTANT GLASS COMPOSITION AND GLASS FIBERS MADE THEREFROM

This invention relates to an alkali resistant glass composition and alkali resistant glass fibers prepared therefrom. The invention also relates to a cementitious product reinforced with the alkali resistant glass fibers.

Glass fibers have found a wide range of utility in fiber-reinforced composite materials such as FRP (fiber-reinforced plastics) because of their superior tensile strength and very high Young's modulus. With the need for constructing skyscrapers in recent years, it has been strongly desired to render cementitious products lighter and stronger, and various investigations have been undertaken on glass fiber-reinforced cements.

One of the important problems in using glass fibers for reinforcing cement is that since $Ca(OH)_2$ derived from CaO as a constituent element of cement is dissolved in a cement matrix to saturation, the cement matrix exhibits strong basicity wity a pH of as high as 12 to 13. Thus, glass fibers are exposed to an alkaline atmosphere not only during their use as a reinforcing material for cementitious products, but also during their ordinary use for prolonged periods of time. When so-called E glass fibers are used, the strength of the fibers themselves is reduced drastically, and the fibers cannot fully exhibit their good characteristics as a reinforcing material. It is essential therefore that glass fibers used, for example, for reinforcing cement should have the highest possible alkali resistance.

Glass compositions of various formulations have been known for producing alkali resistant glass fibers. For example, U.S. Pat. No. 3,861,926 discloses that a glass composition comprising, by mole%, 62 – 72% $SiO_2$, 7 – 11% $ZrO_2$, 13 – 23% $Na_2O$ and 1 – 10% R'O wherein up to 2 mole% of $Na_2O$ can be replaced by $Li_2O$, and R'O is an oxide selected from the group consisting of alkaline earth metal oxides, ZnO and MnO has superior alkali resistance.

Belgian Patent Specification No. 790,844 discloses that a glass composition comprising, by mole%, 67 – 82% $SiO_2$, 7 – 10% $ZrO_2$, 9 – 22.5% $Na_2O$, 0 – 11% R'O and 3 – 9% $F_2$ wherein up to 5 mole% of $Na_2O$ can be replaced by $Li_2O$ or $K_2O$ and R' has the same significance as given above has a lowered viscosity at its melting temperature because of containing 3 to 9 mole% of $F_2$ and is easy to spin, and that since the glass composition has a relatively high $ZrO_2$ content, alkali resistant glass fibers can be formed from it.

As can be seen from these prior art references, the alkali resistance of glass fibers can be increased by increasing the content of $ZrO_2$ in the glass composition but with increasing $ZrO_2$ content, the melt viscosity of the glass increases and its liquidus temperature $(T_L)$ is elevated. This not only causes difficulty of a spinning operation, but also gives rise to crystal grains in the spun glass fibers, which in turn causes a reduction in the strength of the fibers.

Generally, glass fibers are produced by continuously spinning a glass composition from a melter made of platinum or a platinum alloy. In order for the melter to be usable over prolonged periods of time, it is advantageous that the spinning temperature should not exceed 1,350° C., especially 1,320° C. Furthermore, for the production of satisfactory glass fibers, the melt viscosity of the glass composition to be spun through the melter is desirably adjusted to 1,000 poises. In the present application, the temperature of the glass composition at which the viscosity of the glass composition is 1,000 poises is defined as the spinning temperature $(T_F)$.

When a molten glass composition is gradually cooled, crystals precipitate at a certain temperature. This temperature at which the crystals precipitate is the liquidus temperature $(T_L)$.

The spinning temperature $(T_F)$ and the liquidus temperature $(T_L)$ are inherent to a given formulation of glass composition. In order, therefore, to form glass fibers of good quality without fiber breakage during spinning, it is necessary to select a glass composition having a spinning temperature $(T_F)$ higher than the liquidus temperature (preferably $T_F - T_L > 30°$ C.). For ordinary stable operation, it is especially advantageous that $T_F - T_L$ be greater than 50° C.

When cooled beyond the liquidus temperature, a glass composition of a certain formulation becomes opalescent at a certain temperature. This temperature is called an opalescence temperature $(T_o)$. Our investigations have led to the discovery that even a glass composition having an opalescence temperature can be formed into fibers of a uniform texture exhibiting no opalescent phenomenon because the spun glass fibers are quenched, but that when a glass composition having a relatively high opalescence temperature is spun, a glassy phase separation generally occurs in the resulting fibers and sometimes the fibers become opalescent. Desirably, therefore, a glass composition having the lowest possible opalescence temperature should be selected in order to obtain glass fibers having good quality.

It has been known previously that the alkali resistance of a glass composition increases with increasing content of $ZrO_2$. However, when the $ZrO_2$ content is increased, the meltability of the glass composition is reduced, and therefore, it must be heated at higher temperatures in order to melt it uniformly. If the melting temperature is too high, for example, above 1,350° C., imperfections are caused in the material of the melting furnace, and the use of melting temperature above a certain limit is not preferred. Furthermore, when the glass-forming components are vitrified without being uniformly melted, crystal grains occur in the resulting glass composition. Thus, fiber breakage occurs during the spinning of the glass composition, and the resulting glass fibers have deteriorated properties such as reduced strength.

Accordingly, a glass composition having a high $ZrO_2$ content and capable of melting uniformly at as low temperatures as possible has been desired, but it is by no means easy to find such as glass composition.

It has been known that the alkali resistance of the glass composition can be increased by increasing the content of $ZrO_2$. But the increase of the $ZrO_2$ content results in increased spinning temperatures $(T_F)$ and liquidus temperatures $(T_L)$, and brings about undesirable tendencies such as the precipitation of crystals and the reduced meltability. Because of these restrictions, it has been extremely difficult in commercial operations to increase the $ZrO_2$ content to more than 10 mole%, especially to more than 11 mole%.

As a result of our investigations in an attempt to overcome these difficulties, we previously found that the liquidus temperature $(T_L)$ can be lowered by introducing $P_2O_5$ as one component of glass composition, and that by reducing the content of the alkaline earth metal oxides (R'O), a conventional component of conventional glass compositions, to not more than 0.5 mole%, the phase separation and the consequent opalescent phenomenon which frequently occurs not only in the glass composition itself but also during the formation of fibers by quenching a molten mass of the glass composition can be effectively prevented. On the basis of this finding, we suggested in Japanese Pat. application No. 29,100/75 (West German OLS 2,512,286) a glass composition comprising, by mole%, 55 – 69% $SiO_2$, 11.5 – 14% $ZrO_2$, 12 – 23% $R_2O$, 1 – 6% $B_2O_3$, and 1 – 5% $P_2O_5$ wherein R represents an alkali metal, the content of R'O does not exceed 0.5 mole%; R' represents an alkaline earth metal, and the content of the fluoride, calculated as $F_2$, does not exceed 1 mole%; and glass fibers consisting essentially of this composition.

The alkali resistant glass composition previously suggested by us has a liquidus temperature ($T_L$) moderately lower than its spinning temperature ($T_F$) in spite of its very high $ZrO_2$ content of more than 12 mole%. It can therefore be spun stably, and the glassy phase separation and opalescent phenomenon can be prevented. The glass fibers prepared from it have high alkali resistance, and after treatment of synthetic cement, the strength retention of the glass fibers is superior. However, $P_2O_5$, the characteristic constituent element of the glass composition suggested, is pretty expensive and tends to corrode the refractory material that makes up a glass-melting furnace.

It is a primary object of this invention therefore to provide a glass composition which in spite of having a $P_2O_5$ content of substantially zero, has good meltability and can be spun stably, and also possesses superior alkali resistance.

Another object of the invention is to provide alkali resistant glass fibers prepared from the above glass composition.

According to the present invention, the above objects and advantages can be achieved by an alkali-resistant glass composition which has the following composition (I),

| | | |
|---|---|---|
| $SiO_2$ | 61 – 69 | mole% |
| $ZrO_2$ | 11.5 – 12.5 | mole% |
| CaO | 2 – 5 | mole % |
| $R_2O$ | 16 – 20 | mole% |
| $K_2O$ | 2 – 5 | mole% |
| $B_2O_3$ | 1 – 4 | mole% | wherein $R_2O$ represents the total amount of $Na_2O$ and $K_2O$, and the following conditions are met, A. $R_2O$ + CaO $\geq$ 19 mole%,
B. $ZrO_2$ + CaO + $B_2O_3$ $\leq$ 18.5 mole%, and
C. the molar ratio of $K_2O$/CaO $\geq$ 0.5;

and alkali-resistant glass fibers composed basically of such glass composition.

Since the glass composition and glass fibers of this invention have a $P_2O_5$ content of substantially zero, they are lower in cost and less corrosive on refractories than those suggested in Japanese Patent Application No. 29110/75 cited above. Also, as shown in the following Examples, the glass composition of this inveention has good meltability and spinnability despite its high content of $ZrO_2$. The glass composition and the glass fibers of this invention have the advantage that they suffer little from a weight loss after immersion in an alkali solution or an enhanced synthetic cementitious solution, and have a high strength retention after the immersion.

U.S. Pat. No. 3,861,926 substantially excludes the addition of $K_2O$ on the group that it increases the melt viscosity of glass and reduces its alkali resistance (column 7, lines 33 to 39 of the United States Patent). It has been found that when the content of $ZrO_2$ is as high as more than 11.5 mole%, the meltability and spinnability of the glass composition of this invention can be enhanced without so much reducing the alkali resistance of the resulting fibers by incorporating $K_2O$ and CaO in specific molar ratios in addition to $Na_2O$ [see the conditions (A) and (C)].

Our investigations show that in a glass composition having a $ZrO_2$ content of as high as 11.5 to 12.5 mole%, the addition of a suitable amount of $B_2O_3$ can improve its meltability, and that the suitable amount of $B_2O_3$ is closely related to the CaO content. Specifically, we found that in order to maintain an appropriate temperature difference ($T_F - T_L$), the $B_2O_3$ content should generally be rendered comparatively high when the CaO content is low, but when the CaO content is relatively high, the $B_2O_3$ content must be made relatively small [see the condition (B)].

The object of this invention is to provide a glass composition having superior meltability, spinnability and alkali resistance without using $P_2O_5$, and expensive melting aid, despite its high $ZrO_2$ content of 11.5 to 12.5 mole%. In order to achieve this object, it is necessary to limit the contents of the individual oxides to the specific ranges, and it is also important to properly adjust the ratios among $Na_2$, $K_2O$, CaO and $B_2O_3$. Thus, in the present invention, the glass composition must first have the following composition (I),

| | | |
|---|---|---|
| $SiO_2$ | 61 – 69 | mole%, |
| $ZrO_2$ | 11.5 – 12.5 | mole%, |
| CaO | 2 – 5 | mole%, |
| $R_2O$ | 16 – 20 | mole%, |
| $K_2O$ | 2 – 5 | mole%, |
| $B_2O_3$ | 1 – 4 | mole%, | and also meet the following conditions,

A. $R_2O$ + CaO $\geq$ 19 mole%,
B. $ZrO_2$ + CaO + $B_2O_3$ $\leq$ 18.5 mole%, and
c. the molar ratio of $K_2O$/CaO $\geq$ 0.5.

It has been known that calcium fluoride ($CaF_2$) is usable as a flux for glass. An attempt was made previously to prevent the rise of the liquidus temperature ($T_L$) of a high $ZrO_2$ glass composition by adjusting its $F_2$ content to 3 to 9 mole% (for example, Belgian Patent Specification No. 790,844). In the present invention, it is not necessary to incorporate such a large amount of $F_2$ positively. The glass comosition of this invention, however, may contain not more than 1.5 mole%, especially not more than 1 mole% of $F_2$. Preferably, the $F_2$ content should be minimized, and especially rendered substantially zero in order to prevent environmental pollution and the reduction of the alkali resistance.

It was suggested that an alkaline resistant glass composition can be produced by utilizing the interaction of $ZrO_2$ and $TiO_2$ (Belgian Patent Specification No. 810,918). The addition of $TiO_2$ is in no way favorable to the improvement of the alkali resistance, and it is preferred in this invention that the $TiO_2$ content be limited to not more than 0.3 mole%, especially not more than 0.2 mole%. In other words, $TiO_2$ is not used as a positive active ingredient in the present invention.

The content of $Al_2O_3$ in the glass composition of this invention should be limited to not more than 1 mole%. When the $Al_2O_3$ content becomes higher, the liquidus temperature ($T_L$) of the resulting glass composition rises, and its spinnability is aggravated. Hence, the suitable $Al_2O_3$ content is not more than 1 mole%, especially not more than 0.5 mole%.

In the present invention, especially preferred conditions (A), (B) and (C) are the following (A'), (B') and (C').

A'. $R_2O + CaO \geq 20$ mole%,
B'. $ZrO_2 + CaO + B_2O_3 \leq 18$ mole%, and
C'. the molar ratio of $K_2O/CaO \geq 0.6$.

Accordingly, preferred glass compositions of this invention are those in which at least one of the conditions (A), (B) and (C) meets the corresponding conditions (A'), (B') and/or (C'). Among such preferred species, glass compositions which meet all of the conditions (A'), (B') and (C') are most preferred.

An especially preferred condition (A') is shown by the following (A"),

A". $R_2O + CaO \geq 21$ mole%.

Accordingly, preferred glass compositions of this invention are those having the following oxides in the following proportions,

| $SiO_2$ | 61 – 69 | mole%, |
| $ZrO_2$ | 11.5 – 12.5 | mole%, |
| CaO | 2 – 5 | mole%, |
| $R_2O$ | 16 – 20 | mole%, |
| $K_2O$ | 2 – 5 | mole%, |
| $B_2O_3$ | 1 – 4 | mole% |

($R_2O$ represents the total amount of $Na_2O$ and $K_2O$), and meeting the following conditions, A'. $R_2O + CaO \geq 20$ mole%,
B'. $ZrO_2 + CaO + B_2O_3 \leq 18$ mole%,
C'. the molar ratio of $K_2O/CaO \geq 0.6$.

These glass compositions have especially good meltability and a moderate $(T_F - T_L)$ value, and therefore possess good spinnability.

Preferred glass compositions of this invention which have high alkali resistance (for example, a small weight loss in a sodium hydroxide solution, and in an enhanced synthetic cementitious solution to be described), a high retention of strength in these alkali solutions, and relatively good spinnability have the following composition (II),

| $SiO_2$ | 63 – 67 | mole%, |
| $ZrO_2$ | 12 – 12.5 | mole%, |
| CaO | 3 – 4.5 | mole%, |
| $R_2O$ | 17 – 19 | mole%, |
| $K_2O$ | 2.5 – 4 | mole%, |
| $B_2O_3$ | 1 – 2.5 | mole% |

($R_2O$ represents the total amount of $Na_2O$ and $K_2O$), and meeting the following conditions, B. $ZrO_2 + CaO + B_2O_3 \leq 18.5$ mole%.

The conditions (A) and (B) are automatically met in these conditions.

Hence, especially suitable glass compositions of this type are those containing the oxides of the above compositin (II) and meeting one or both of the conditions (B') and (C'). Those which further meet the conditions (A") mentioned above are satisfactory in all of alkali resistance, meltability and spinnability.

The glass compositions of this invention may further contain not more than 1 mole%, preferably not more than 0.5 mole%, of an impurity of the following formula $M_xO_y$ wherein M is at least one metal selected from the group consisting of V, Cr, Mn, Fe, Co, Cu, Zn, As, Y, Mo, Cd, Sn, Sb, Hf and Ce, and x and y are positive integers with the proviso that the value of M multiplied by x equals 2y.

In the present application, the contents of the metal oxides are expressed in mole% with the total amount of the metal oxides taken as 100 mole%. The $F_2$ content is neglected.

The glass fibers of this invention are especially useful as cement reinforcing materials because they have high alkali resistance, suffer little from a weight loss when immersed in a synthetic cementitious solution, especially in an enhanced cementitious solution to be described, and retain superior tensile strength and Young's modulus over long periods of time.

In order to produce glass fiber-reinforced cementitious products, the diameter of each of the fibers is preferably 5 to 50 microns, and the content of the glass fibers in the cementitious products is preferably 0.3 to 25% by weight based on the cement, although they vary according to the use of the cementitious product and the method of fabricating it. If the fiber diameter is smaller than 5 microns, the reinforcing effect is low, and the dispersibility of the fibers becomes poor. On the other hand, if the fiber diameter exceeds 50 microns, the effect of improving the impact strength and bending strength of the reinforced product is reduced, and there is a frequent break of the glass fibers when they are mixed with cement. Accordingly, the preferred diameter of each of the fibers is 7 to 30 microns. If the amount of the glass fibers to be incorporated is less than 0.3% by weight, no sufficient reinforcement can be accomplished. Amounts in excess of 25% by weight may render the mixing of the glass fibers nonuniform, and afford rather weak products. Alternatively, interstices occur as a result of intertwining of the fibers, and the density and strength of the resulting product are reduced. This is economically disadvantageous. For sufficient reinforcement of ordinary mortar or concrete, the glass fibers are incorporated in it in an amount of 0.5 to 20% by weight, preferably 1 to 15% by weight. As an asbestos substitute in the production of asbestos cement sheets, the glass fibers of this invention are used in an amount of preferably 1 to 20% by weight, more preferably 5 to 15% by weight. The glass fibers to be incorporated in the cement matrix can be in the form of either continuous filaments or staples. Structures of the glass fibers, for example, chopped strands, yarns, tapes, mats, a downy mass, knitted fabrics and woven fabrics, can also be utilized in this invention. Any desired form can be selected according, for example, to the utility and the method of fabrication.

Where the glass fibers are used as staples, the suitable fiber length is 1 to 100 mm. If the length is less than 1 mm, the reinforcing effect is extremely poor, and if it exceeds 100 mm, the glass fibers cannot be uniformly dispersed by merely mixing them mechanically with cement mortar. When glass fibers having a fiber length of more than 100 mm are used, they can be aligned in the cement mortar in the form of filaments or their structures such as knitted, woven or nonwoven fabrics.

Reinforced cementitious structures can be produced by a method comprising mixing the cement and the glass fibers in the dry state and then adding water to the mixture, or a method comprising mixing or laminating the glass fibers in or onto a cement slurry, or a method involving mixing the glass fibers simultaneously with the molding of cement. The mixture can then be fabricated by any desired method selected according to the purpose of fabrication and the use of the fabricated product, for example, by a die-casting method, a spray method, a spray suction method, an extrusion method, or a sheet-forming method. Curing of the cementitious product can be performed by allowing the product to stand at room temperature, or by using any other desired method such as a centrifugal molding method, a pressurized curing method, or a steam-curing method. The term "cement", as used in this application, denotes ordinary hydraulic cements typified by Portland cement. When it is made into a cement slurry, the cement means one from which basic components are generated, for example, Portland cement or calcium silicate. If desired, an aggregate such as sands, stones, or perlite can be incorporated in cement.

The cementitious structures that can be produced in this invention cover a wide vriety of cementitious products such as press concrete, autoclaved concrete, resin-impregnated cement, light-weight cement, gas concrete, asbestos cement, or asbestos-calcium silicate.

The glass fiber-reinforced cementitious products obtained in accordance with this invention have high resistance to alkaline aqueous solutions and possess high tensile strength, bending strength and impact strength over long periods of time without the glass fibers being corroded by basic components in the cement such as calcium hydroxide or without gradually losing their inherent mechanical properties. For this reason, these cementitious products are useful for various applications, for example, architectural materials such as interior and exterior wall panels, ceiling materials, flooring materials or rooftiles of various structures, and civil engineering and garden landscaping materials such as channels, pipes, ground material, or concrete blocks. Thus, the commercial value of these reinforced cementitious products is indeed great.

The following Examples and Comparative Examples illustrate the present invention in greater detail. The following experimental results, however, are given only to illustrate the invention for easier understanding and not intended in any way to limit the scope of the invention. The various tests and evaluations made in these experiments were as follows:

Composition of glass

Unless otherwise specified, the individual components of the glass are expressed in mole%.

Spinning temperature ($T_F$)

About 250 g of a sample glass mass is melted in an alumina crucible at 1,500° C. for 2 hours, and then completely refined. A Pt-Rh (80/20 percent) ball with a diameter of 10 mm hanging from a platinum wire is let fall onto the molten glass, and maintained for 1 hour at a predetermined temperature. After rendering the temperature of the sample molten glass uniform, the ball is taken out. The distance over which the ball is pulled up by the platinum wire is measured by means of a viscosity balance. The above operation is repeated three times, and an average of the three replicates is calculated. The same procedure is repeated with regard to several measuring temperatures, and the temperature-viscosity curve is plotted, and a temperature corresponding to a viscosity of 1,000 poises is read.

Liquidus temperature ($T_L$)

Using a devitrification tester having a platinum plate with a size of 20 × 350 mm and 26 holes having a diameter of 1.5 mm arranged at an interval of 10 mm, a sample glass bead is placed in each of the holes. The platinum plate carrying the glass particles is set in an electric furnace having a temperature gradient of about 300° C. between its center and each of the holes at the ends, and maintained for 16 hours to heat-treat the glass. After the treatment, the glass beads are quenched in the air, and examined by a polarization microscope for devitrified crystals. The maximum temperature at which the crystals are formed is defined as the liquidus temperature ($T_L$).

Measurement of meltability

1. Number of unmelted crystal grains

A sample glass batch is melted for 3 hours at a predetermined temperature (1,250°, 1,300°, 1,350°, 1,400° and 1,450° C.) in a 300 cc platinum crucible to form glass having a weight of about 100 g. The glass is then fabricated into rods having a diameter of 5 to 6 mm. 20 g of the rods are collected at random, and the number of unmelted crystal grains in the rods is calculated under a polarizing microscope with a magnification of 100 X. The number of unmelted crystal grains present in 100 g of glass is calculated by multiplying the resulting value by 5. The results are evaluated on a scale of excellent, good, fair and poor as follows:

Excellent: No unmelted crystal grains observed
Good: 1 to 10 crystal grains present
Fair: 10 to 100 crystal grains present
Poor: more than 100 crystal grains present 2. Measurement of the melting time (minutes)

A glass batch is melted at 1,500° C. for a predetermined period of time in a 10 cc platinum crucible to produce 5 g of glass. The glass is observed under an optical microscope with a magnification of 50 X for the presence of crystal grains, and the time required until the crystal grains are completely melted is measured.

Comparative Example 1

In order to understand the meltability, spinnability, and alkali resistance of generally known glass compositions having a high $ZrO_2$ content, a glass batch of the varying formulations shown in Table I was melted at 1,500° C. for 5 hours in a platinum alloy crucible. The liquidius temperature ($T_L$) and spinning temperature ($T_F$), at a viscosity of 1000 poises) of the resulting glass compositions were measured. In Run No. 1, the glass composition used was one disclosed in M. I. Kozmin, Glass & Ceramics, 17, p. 561 (1960), and the glass compositions in Runs Nos. 2 and 3 were given in Nos. 6/29, and 6/33 described at page 120 of Volf, Technical Glass.

The resulting glass composition (cullet) was spun using a 300 cc platinum-rhodium (80/20 percent) melter including 36 tips, and taken up at a wind-up rate of 1000 meters/min. The alkali resistance of the resulting fibers having a fiber diameter of 13 ± 0.1 μ was measured. The results are shown in Table 1.

The spinnability was evaluated by observing the filament breakage in the production of fibers having a fiber diameter of 13 ± 0.1 μ. The results were evaluated on a scale of excellent, good, fair, and poor as follows:

Excellent: No filament breakage occurred during continuous spinning for 1 hour

Good: Several filament breakages occurred during the 1 hour operation

Fair: Fiberization was possible although several filament breakages occurred

Poor: Fiberization quite impossible.

The alkali solubility (%) was measured in the following manner.

Measurement of alkali solubility (%)

1. About 1 g of a sample bundle of glass fibers with a length of 5 cm were cut off. The cut bundle of fibers was fully loosened to divide it into monofilaments. After it was thoroughly separated into the monofilaments, the fibers were accurately weighed (the weight being $W_0$ g), and placed in a 200 cc beaker containing 10 cc of a 10% aqueous solution of sodium hydroxide. Then, the fibers were immersed therein at 80° C. for 1 hour to perform the alkali treatment. Then, the monofilaments treated were withdrawn, washed first with a 1/10N aqueous solution of hydrochloric acid and then thoroughly with water, and dried to a constant weight at 120° C. (the weight being $W_1$ g). The weight loss of the sample was calculated on the basis of the following equation.

Alkali solubility (%) = $(W_0 - W_1)/W_0 \times 100$ where $W_0$ is the weight of the glass fibers before the alkali treatment, and $W_1$ is the weight of the glass fibers after the alkali treatment.

2. The same procedure as in the above alkali treatment was performed except that an enhanced synthetic cementitious aqueous solution (NaOH: 26.4 g/liter, KOH: 103.5 g/liter, $Ca(OH)_2$: 1.0 g/liter) was used instead of the aqueous sodium hydroxide solution. The treated fibers were washed first with a 1/10N aqueous solution of hydrochloric acid, and then thoroughly with water, and dried at 120° C. The weight loss of the glass fibers on treatment was calculated on the basis of the following equation.

Weight loss in enhanced synthetic cementitious solution (%) = $\dfrac{W'_0 - W'_1}{W'_0} \times 100$ where $W'_0$ is the weight of the glass fibers before the treatment, and $W'_1$ is the weight of the glass fibers after the treatment.

Table 1

| Composition | | 1 | 2 | 3 |
|---|---|---|---|---|
| | $SiO_2$ | 67.3 | 70.2 | 66.9 |
| | $ZrO_2$ | 9.7 | 11.6 | 10.1 |
| | $Al_2O_3$ | 2.5 | 0.5 | — |
| | CaO | 5.8 | 0.6 | 6.0 |
| | MgO | 0.3 | — | — |
| | $Na_2O$ | 12.6 | 15.4 | 15.2 |
| | $K_2O$ | 1.8 | 1.7 | 1.8 |
| Liquidus temperature ($T_L$, ° C.) | | >1380 | 1220 | 1200 |
| Spinning temperature (° C.) | | 1350 | 1384 | 1288 |
| Spinnability | | Poor | Poor to fair | Good |
| Meltability (the number of crystal grains) | 1400° C. | Poor | Fair | Good |
| | 1350° C. | Poor | Poor | Poor |
| Alkali resistance (weight loss, %) | in 10% NaOH at 80° C/1 hr | — | 1.3 | 1.0 |
| | in enhanced synthetic cementitious solution at 80° C/1 hr | — | 1.1 | 0.8 |

It can be seen from Table 1 that the compositions obtained in Runs 2 and 3 could be fiberized, and the resulting glass had fairly high alkali resistance. However, the composition according to Run No. 2 had a high spinning temperature, and would shorten the life of the melter used in commercial glass production. The composition according to Run No. 3 has feasible spinnability, but suffers from poor meltability. This would cause the occurrence of unmelted crystal grains in the commercial production of glass by a melting tank. Furthermore, since it has a high melting temperature, it may heavily corrode the refractories of the melting tank.

Comparative Example 2

An attempt was made to increase the alkali resistance of the glass composition according to Run No. 3 of Comparative Example 1 by increasing the amount of $ZrO_2$. Glass compositions of the formulations shown in Table 2 were produced in accordance with the procedure of Comparative Example 1, and fiberized. The various properties of the resulting glass fibers were measured, and the results are shown in Table 2.

Table 2

| Composition | | 4 | 5 |
|---|---|---|---|
| | $SiO_2$ | 66.0 | 65.0 |
| | $ZrO_2$ | 11.0 | 12.0 |
| | CaO | 6.0 | 6.0 |
| | $Na_2O$ | 15.2 | 15.2 |
| | $K_2O$ | 1.8 | 1.8 |
| Liquidus temperature ($T_L$, ° C.) | | 1270 | 1320 |
| Spinning temperature (° C.) | | 1292 | 1293 |
| Spinnability | | Fair | Poor |
| Meltability (the number of crystal grains) | 1400° C. | Good | Fair |
| | 1350° C. | Poor | Poor |
| Alkali resistance (weight loss, %) | in 10% NaOH at 80° C/1 hr | 0.9 | 0.8 |
| | in enhanced synthetic cementitious solution at 80° C/1 hr | 0.7 | 0.6 |

The results shown in Table 2 demonstrate that with increasing $ZrO_2$ content, the liquidus temperature of the glass composition increases, and its spinnability becomes worse. The alkali resistance of the glass composition, however, increases in proportion to the amount of $ZrO_2$.

EXAMPLE 1

As is clear from the results obtained in Comparative Examples 1 and 2, the alkali resistance becomes better in proportion to the content of $ZrO_2$. The increase of the $ZrO_2$ content, however, poses the two problems described below in the commercial production of alkali-resistant glass fibers.

1. The meltability of the glass composition at the time of glass formation is poor.

2. The difference between the liquidus and spinning temperatures $[T_F - T_L (°C.)]$ becomes small because of an abrupt rise in liquidus temperature, and consequently, the spinnability of the glass composition becomes poor.

In the present Example, $B_2O_3$ was added as one component of glass in order to improve the meltability of the glass composition at the time of glass formation.

Specifically, the meltability of glass having the compositions shown in Table 3 was evaluated by the methods (1) and (2) described hereinabove. Furthermore, glass of each composition was produced in a platinum alloy crucible by melting at 1,450° C. for 5 hours, and the liquidus temperature ($T_L$) and spinning temperature ($T_F$) of the resulting glass were measured.

The glass compositions obtained were fiberized according to the procedure set forth in Comparative Example 1 to form glass fibers having a fiber diameter of 13 ± 0.1 μ, and their alkali resistance was measured. The measurement was performed in the same way as in Comparative Example 1 except that the glass fibers were treated in a 10% aqueous solution of sodium hydroxide at 80° C. for 50 hours, and in an enhanced synthetic cementitious solution at 80° C. for 100 hours. The results are shown in Table 3.

The glass compositions were fiberized in the same way as in Example 1, and the alkali resistances of the fibers were measured.

In the above fiberization procedure, 36 filaments were gathered using a size composed mainly of a 14% by weight emulsion of a vinyl acetate polymer (VQ-533, a trademark for a product of Kanebo Ltd.) to form a glass fiber strand. The strand was taken up on a bobbin, and dipped in an enhanced synthetic cementitious solution of the type described above at 80° C. for 20 hours. The tensile strength ($kg/mm^2$) of the fibers before and after immersion was measursed.

The strength retention (%) of the fibers after the treatment was measured by the following method.

Twenty strands each consisting of 36 filaments were withdrawn from bobbins. Each of the strands were kept taut and fixed at its two opposite ends to a square stainless steel frame, measuring 10 cm by 10 cm in its inside dimension, by an epoxy esin adhesive so that the strands were aligned in parallel to one another on the frame. The frame was then immersed in a tall beaker containing 2 liters of an enhanced synthetic cementitious solu- Table 3

| | | 1-1 (comparison) | 1-2 | 1-3 | 1-4 | 1-5 comparison | 1-6 (comparison) |
|---|---|---|---|---|---|---|---|
| Composition | | | | | | | |
| $SiO_2$ | | 67 | 66 | 65 | 64 | 63 | 62 |
| $ZrO_2$ | | 12 | 12 | 12 | 12 | 12 | 12 |
| CaO | | 3 | 3 | 3 | 3 | 3 | 3 |
| $Na_2O$ | | 15 | 15 | 15 | 15 | 15 | 15 |
| $K_2O$ | | 3 | 3 | 3 | 3 | 3 | 3 |
| $B_2O_3$ | | 0 | 1 | 2 | 3 | 4 | 5 |
| Glass-forming temperature (° C.) | | 1450 | 1450 | 1450 | 1450 | 1450 | 1450 |
| Liquidus temperature ($T_L$ ° C.) | | 1235 | 1229 | 1225 | 1220 | 1216 | 1212 |
| Spinning temperature ($T_F$ ° C.) | | 1333 | 1306 | 1290 | 1268 | 1251 | 1228 |
| Spinnability | | Good | Excellent | Excellent | Excellent | Good | Fair |
| Meltability | 1250 | Poor | Poor | Poor | Poor | Poor | Poor |
| Number of | 1300 | Poor | Poor | Poor | Poor | Fair | Fair |
| crystal grains | 1350 | Poor | Good | Excellent | Excellent | Excellent | Excellent |
| Melting temp- | 1400 | Good | Excellent | Excellent | Excellent | Excellent | Excellent |
| erature (° C.) | 1450 | Excellent | Excellent | Excellent | Excellent | Excellent | Excellent |
| Melting time (min.) | | 85 | 52 | 40 | 31 | 23 | 18 |
| Alkali resistance (weight loss, %) | 10% NaOH at 80° C/50 hrs | 9.6 | 10.4 | 11.3 | 11.9 | 12.4 | 13.8 |
| | in enhanced synthetic cementitious solution at 80° C/100 hrs | 7.2 | 8.0 | 9.1 | 9.5 | 10.4 | 11.9 |

The results shown in Table 3 demonstrate that the meltability of the glass composition can be greatly improved by adding $B_2O_3$. Since, however, the addition of $B_2O_3$ results in a reduction in alkali resistance, its amount should be restricted to the minimum amount required for improving meltability. The amount of $B_2O_3$ should therefore be 1 to 4 mole%, preferably 1 to 2.5 mole%.

EXAMPLE 2

In this Example, $K_2O$ was added as one component of glass in order to improve the spinnability of the glass composition by lowering the liquidus temperature and thereby increasing the difference $T_F - T_L$ (° C.). Glass compositions having the formulations shown in Table 4 were produced using a platinum alloy crucible by melting at 1,500° C. for 5 hours, and the liquidus temperature ($T_L$) and spinning temperature ($T_F$) of the resulting glass compositions were measured.

tion at 80° C. for 20 hours. The frame was then taken out from the beaker, washed first with a 1/10N aqueous solution of hydrochloric acid and then thoroughly with water, and dried at 40° C. for 8 hours in a hot air circulating dryer. Then, the strands were cut off from the frame to a length of 2 cm, and the tensile strength of each strand was measured at a pulling speed of 0.2 cm/min. using a Tensilon tester. The tensile strength of the strands after treatment ($T'_1$ $kg/mm^2$) was expressed in terms of an average of the strengths of 20 strands. The tensile strength of the strands before treatment ($T'_0$ $kg/mm^2$) was measured by the same procedure, and expressed in terms of an average of the strengths of the 20 strands.

The strength retention after treatment in the enhanced synthetic cementitious solution was calculated on the basis of the following equation.

Strength retention (%) = $T'_1/T'_0 \times 100$

The results obtained are shown in Table 4.

Table 4

|  |  | 2-1 (comparison) | 2-2 (comparison) | 2-3 | 2-4 | 2-5 | 2-6 (comparison) |
|---|---|---|---|---|---|---|---|
| Composition |  |  |  |  |  |  |  |
|  | $SiO_2$ | 63.5 | 63.5 | 63.5 | 63.5 | 63.5 | 63.5 |
|  | $ZrO_2$ | 12 | 12 | 12 | 12 | 12 | 12 |
|  | CaO | 4 | 4 | 4 | 4 | 4 | 4 |
|  | $Na_2O$ | 18.5 | 17.5 | 16.5 | 15.5 | 13.5 | 12.5 |
|  | $K_2O$ | 0 | 1 | 2 | 3 | 5 | 6 |
|  | $B_2O_3$ | 2 | 2 | 2 | 2 | 2 | 2 |
| Liquidus temperature ($T_L$ ° C.) |  | 1244 | 1238 | 1230 | 1225 | 1218 | 1210 |
| Spinning temperature ($T_F$ ° C.) |  | 1249 | 1251 | 1261 | 1267 | 1280 | 1295 |
| Spinnability |  | Poor | Fair | Good | Excellent | Excellent | Excellent |
| Crystal grains in the fibers |  | Yes | Some | No | No | No | No |
| Melt-ability | Melting time (min.) in 10% NaOH at 80° C/50 hrs. | 40 | 37 | 33 | 32 | 31 | 31 |
|  | Weight loss (wt. %) in enhanced synthetic cementitious solution at 80° C/100 hrs | 10.3 | 10.3 | 10.5 | 10.6 | 11.1 | 12.0 |
|  |  | 7.5 | 7.8 | 7.9 | 8.2 | 8.5 | 9.3 |
| Alkali resistance | Untreated yarn (kg/mm²) | — | 131 | 148 | 155 | 162 | 160 |
| Yarn quality | Treated yarn (kg/mm²) | — | 46 | 71 | 72 | 68 | 61 |
|  | Strength retention (%) after treatment in enhanced synthetic cementitious solution | — | 35.1 | 48.0 | 46.5 | 42.0 | 38.1 |

The results shown in Table 4 demonstrate that the addition of $K_2O$ results in an increase in the difference between $T_F$ and $T_L$, and betters the spinnability of the glass composition. The meltability of the glass composition can be somewhat improved. The amount of $K_2O$ should be kept within the range of 2 to 5 mole %, preferably 2,5 to 4 mole%, because the inclusion of $K_2O$ tends to reduce the alkali resistance of the glass composition.

EXAMPLE 3

Various glass compositions with a $ZrO_2$ content of 11 to 13 mole% were produced in accordance with the procedure of Example 1, and their liquidus temperatures and spinning temperatures were measured. The glass compositions were fiberized in the same way as in Example 1, and the various properties of the resulting glass fibers were measured. The results are shown in Table 5.

Table 5

|  |  | 3-1 (comparison) | 3-2 | 3-3 | 3-4 | 3-5 (comparison) |
|---|---|---|---|---|---|---|
| Composition |  |  |  |  |  |  |
|  | $SiO_2$ | 65 | 64.5 | 64 | 63.5 | 63 |
|  | $ZrO_2$ | 11.0 | 11.5 | 12.0 | 12.5 | 13.0 |
|  | CaO | 4 | 4 | 4 | 4 | 4 |
|  | $Na_2O$ | 13 | 13 | 13 | 13 | 13 |
|  | $K_2O$ | 5 | 5 | 5 | 5 | 5 |
|  | $B_2O_3$ | 2 | 2 | 2 | 2 | 2 |
| Liquidus temperature ($T_L$ ° C.) |  | 1170 | 1185 | 1207 | 1220 | 1249 |
| Spinning temperature ($T_F$ ° C.) |  | 1261 | 1262 | 1265 | 1266 | 1268 |
| Spinnability |  | Excellent | Excellent | Excellent | Good | Poor to fair |
| Crystal grains in the fibers |  | No | No | No | No | Some |
| Melt-ability | Melting time (min.) in 10% NaOH at 80° C/50 hrs. | 24 | 29 | 35 | 48 | 83 |
|  | Weight loss (wt. %) in enhanced synthetic cementitious solution at 80° C/100 hrs. | 14.1 | 12.7 | 11.6 | 10.7 | 10.4 |
|  |  | 12.6 | 11.1 | 9.7 | 8.5 | 8.0 |
| Alkali resistance | Untreated yarn (kg/mm²) | 160 | 161 | 159 | 157 | 135 |
| Yarn quality | Treated yarn (kg/mm²) | 52 | 66 | 73 | 74 | 51 |
|  | Strength retention (%) after treatment in enhanced synthetic cementitious solution | 32.5 | 41.0 | 45.9 | 47.1 | 37.8 |

From the results shown in Table 5, it can be seen that the alkali resistance increases greatly with increasing $ZrO_2$ content. The increase of $ZrO_2$ content, however, causes elevated liquidus temperatures and leads to poor spinnability. The meltability of the glass composition is also drastically reduced by increasing the amount of $ZrO_2$. The amount of $ZrO_2$ should therefore be restricted to 11.5 to 12.5 mole%, preferably 12 to 12.5 mole%.

EXAMPLE 4

Various glass compositions with a CaO content of 1 to 6 mole% were produced in accordance with the procedure of Example 1, and their liquidus temperatures and spinning temperatures were measured. The glass compositions were fiberized by the same procedure as in Example 1, and the properties of the fibers obtained were measured.

The results are shown in Table 6.

the procedure of Example 1, the glass compositions were fiberized, and the various properties of the glass fibers were measured. The results are shown in Table 7.

Table 7

|  |  | 5-1 (comparison) | 5-2 | 5-3 | 5-4 | 5-5 | 5-6 (comparison) |
|---|---|---|---|---|---|---|---|
| Composition |  |  |  |  |  |  |  |
|  | $SiO_2$ | 68.0 | 67.0 | 66.0 | 65.0 | 64.0 | 63.0 |
|  | $ZrO_2$ | 12 | 12 | 12 | 12 | 12 | 12 |
|  | CaO | 3.0 | 3.0 | 3.0 | 3.0 | 2.5 | 2.5 |
|  | $Na_2O$ | 11.5 | 12.5 | 13.5 | 14.5 | 16.0 | 17.0 |
|  | $K_2O$ | 3.5 | 3.5 | 3.5 | 3.5 | 3.5 | 3.5 |
|  | $B_2O_3$ | 2.0 | 2.0 | 2.0 | 2.0 | 2.0 | 2.0 |
| Liquidus temperature ($T_L$ °C.) |  | 1350 | 1306 | 1270 | 1220 | 1247 | 1270 |
| Spinning temperature ($T_F$ °C.) |  | 1337 | 1329 | 1317 | 1309 | 1300 | 1290 |
| Spinnability |  | Poor | Poor to fair | Good | Excellent | Fair to Good | Poor |
| Crystal grains in the fibers |  | Yes | Some | No | No | No | Yes |
| Meltability | Melting time (min.) | 75 | 57 | 46 | 40 | 33 | 29 |
| Alkali resistance (weight loss, wt. %) | in 10% NaOH at 80° C/50 hrs. | — | 11.8 | 11.5 | 11.2 | 11.0 | — |
|  | in enhanced synthetic cementitious solution at 80° C/100 hrs. | — | 9.3 | 9.0 | 8.8 | 8.5 | — |

The results shown in Table 7 demonstrate that the meltability of the glass composition is improved in pro- Table 6

|  |  | 4-1 (comparison) | 4-2 | 4-3 | 4-4 | 4-5 | 4-6 (comparison) |
|---|---|---|---|---|---|---|---|
| Composition |  |  |  |  |  |  |  |
|  | $SiO_2$ | 66.5 | 65.5 | 64.5 | 63.5 | 62.5 | 61.5 |
|  | $ZrO_2$ | 11.5 | 11.5 | 11.5 | 11.5 | 11.5 | 11.5 |
|  | CaO | 1 | 2 | 3 | 4 | 5 | 6 |
|  | $Na_2O$ | 14.5 | 14.5 | 14.5 | 14.5 | 14.5 | 14.5 |
|  | $K_2O$ | 3.5 | 3.5 | 3.5 | 3.5 | 3.5 | 3.5 |
|  | $B_2O_3$ | 2 | 2 | 2 | 2 | 2 | 2 |
| Liquidus temperature ($T_L$ °C.) |  | 1192 | 1200 | 1213 | 1227 | 1239 | 1252 |
| Spinning temperature ($T_F$ °C.) |  | 1303 | 1292 | 1275 | 1269 | 1258 | 1250 |
| Spinnability |  | Excellent | Excellent | Excellent | Good | Fair | Poor |
| Crystal grains in the fibers |  | No | No | No | No | Some | Yes |
| Meltability | Melting time (min.) | 33 | 29 | 28 | 28 | 27 | 27 |
| Weight loss (wt. %) | in 10% NaOH at 80° C/50 hrs. | 13.7 | 12.6 | 12.3 | 12.0 | 11.6 | — |
|  | in enhanced synthetic cementitious solution at 80° C/100 hrs. | 11.9 | 10.3 | 10.0 | 9.7 | 9.4 | — |
| Alkali resistance Yarn quality | Untreated yarn (kg/mm²) | 160 | 161 | 161 | 160 | 152 | — |
|  | Treated yarn (kg/mm²) | 55 | 61 | 64 | 67 | 58 | — |
|  | Strength retention (%) after treatment in enhanced synthetic cementitious solution | 34.3 | 39.1 | 39.8 | 41.9 | 38.2 | — |

The results of Table 6 demonstrate that the liquidus temperature rises in proportion to the CaO content, and the difference between $T_F$ and $T_L$ becomes small, leading to poor spinnability. The addition of CaO, on the other hand, somewhat betters the meltability of the glass composition, and improves its alkali resistance. Accordingly, the CaO content should be limited to 2 to 5 mole%, preferably 3 to 4.5 mole%.

EXAMPLE 5

Various glass compositions with an ($Na_2O + K_2O$) content of 15 to 21 mole% were produced by the same procedure as in Example 1, and the liquidus temperatures and spinning temperatures of these glass compositions were measured. Furthermore, in accordance with portion to the $Na_2O$ content, and its alkali resistance can be improved. Since there is a minimum value in the liquidus temperature, the total amount of $Na_2O + K_2O$ should be limited to 16 to 20 mole%, preferably 17 to 19 mole%, from the viewpoing of spinnability.

EXAMPLE 6

Various glass compositions shown in Table 8 were produced in accordance with the procedure described in Example 1, and the liquidus temperatures and spinning temperatures of the resulting glass compositions were measured. The glass compositions were each fiberized in the same way as in Example 1, and the alkali resistance of the glass fibers were measured. The results are shown in Table 8.

Table 8

|  | | 6-1 | 6-2 (comparison) | 6-3 (comparison) | 6-4 (comparison) | 6-5 (comparison) | 6-6 (comparison) |
|---|---|---|---|---|---|---|---|
| Composition | | | | | | | |
| | $SiO_2$ | 63.5 | 63.5 | 63.5 | 63.5 | 63.5 | 63.5 |
| | $ZrO_2$ | 12 | 12 | 12 | 12 | 12 | 12 |
| | CaO | 4 | 2.5 | 2.5 | 2.5 | 2 | 3 |
| | MgO | | 1.5 | | | | |
| | BaO | | | 1.5 | | | |
| | ZnO | | | | 1.5 | | |
| | $CaF_2$ | | | | | 2 | |
| | $Na_2O$ | 16 | 16 | 16 | 16 | 16 | 16 |
| | $K_2O$ | 2 | 2 | 2 | 2 | 2 | 2 |
| | $Li_2O$ | | | | | | |
| | $B_2O_3$ | 1.5 | 1.5 | 1.5 | 1.5 | 1.5 | 1.5 |
| | $Al_2O_3$ | | | | | | 1 |
| Glass-forming temperature (° C.) | | 1500 | 1550 | 1550 | 1500 | 1500 | 1500 |
| Liquidus temperature ($T_L$ ° C.) | | 1240 | >1350 | 1256 | 1262 | 1239 | 1281 |
| Spinning temperature ($T_F$ ° C.) | | 1273 | 1282 | 1270 | 1272 | 1255 | 1275 |
| Spinnability | | Good | Poor | Poor to fair | Poor to fair | Poor to fair | Poor |
| Alkali resistance (weight loss wt. %) | in 10% NaOH at 80° C/50 hrs. | 11.2 | — | 11.4 | 11.7 | 12.0 | — |
| | in enhanced synthetic cementitious solution at 80° C/100 hrs. | 8.9 | — | 9.5 | 9.6 | 10.1 | — |

What we claim is

1. An alkali resistant glass composition consisting essentially of

| $SiO_2$ | 61 - 69 mole%, |
| $ZrO_2$ | 11.5 - 12.5 mole%, |
| CaO | 2 - 5 mole%, |
| $R_2O$ | 16 - 20 mole%, |
| $K_2O$ | 2 - 5 mole%, |
| $B_2O_3$ | 1 - 4 mole%, |
| $P_2O_5$ | substantially 0 |
| $TiO_2$ | 0 - 0.3 mole%, and |
| $M_xO_y$ | 0 - 1 mole% | wherein $R_2O$ represents the total amount of $Na_2O$ and $K_2O$; M is at least one metal selected from the group consisting of V, Cr, Mn, Fe, Co, Cu, Zn, As, Y, Mo, Cd, Sn, Sb, Hf and Ce; x and y are positive integers with the proviso that the valence of m multiplied by x equals 2y; and the content of fluorides, calculated as $F_2$, is 0 to 1 mole%, and meeting the following conditions, A. $R_2O$ + CaO $\geq$ 29 mole%,
B. $ZrO_2$ + CaO + $B_2O_3$ $\leq$ 18.5 mole%, and
C. the molar ratio of $K_2O$/CaO $\geq$ 0.5.

2. The composition of claim 1 wherein said oxides meet the following conditions, A'. $R_2O$ + CaO $\geq$ 20 mole%,
B'. $ZrO_2$ + CaO + $B_2O_3$ $\leq$ 1 mole%, and
C'. the molar ratio of $K_2O$/CaO $\geq$ 0.6.

3. Alkali resistant glass fibers composed of a glass composition consisting essentially of

| $SiO_2$ | 61 - 69 mole%, |
| $ZrO_2$ | 11.5 - 12.5 mole%, |
| CaO | 2 - 5 mole%, |
| $R_2O$ | 16 - 20 mole%, |
| $K_2O$ | 2 - 5 mole%, |
| $B_2O_3$ | 1 - 4 mole%, |
| $P_2O_5$ | substantially 0 |
| $TiO_2$ | 0 - 0.3 mole%, and |
| $M_xO_y$ | 0 - 1 mole% | wherein $R_2O$ represents the total amount of $Na_2O$ and $K_2O$; M is at least one metal selected from the group consisting of V, Cr, Mn, Fe, Co, Cu, Zn, As, Y, Mo, Cd, Sn, Sb, Hf and Ce; x and y are positive integers with the proviso that the valence of M multiplied by $x$ equals $2y$; and the content of fluorides, calculated as $F_2$, is 0 to 1 mole%, and meeting the following conditions, A. $R_2O$ + CaO $\geq$ 19 mole%,
B. $ZrO_2$ + CaO + $B_2O_3$ $\leq$ 18.5 mole %, and
C. the molar ratio of $K_2O$/CaO $\geq$ 0.5.

4. The fibers of claim 3 wherein said oxides meet the following conditions,

A'. $R_2O$ + CaO $\geq$ 20 moles %,
B'. $ZrO_2$ + CaO + $B_2O_3$ $\leq$ 18 mole%, and
C'. the molar ratio of $K_2O$/CaO $\geq$ 0.6.

5. The fibers of claim 3 wherein said oxides meet the following conditons,

A''. $R_2O$ + CaO $\geq$ 21 mole%,
B''. $ZrO_2$ + CaO + $B_2O_3$ $\leq$ 18 mole%, and
C''. the molar ratio of $K_2O$/CaO $\geq$ 0.6.

6. The fibers of claim 3 which contain the following oxides,

| $SiO_2$ | 63 - 67 mole %, |
| $ZrO_2$ | 12 - 12.5 mole %, |
| CaO | 3 - 4.5 mole %, |
| $R_2O$ | 17 - 19 mole %, |
| $K_2O$ | 2.5 - 4 mole %, and |
| $B_2O_3$ | 1 - 2.5 mole %, | and meet the following condition,

B. $ZrO_2$ + CaO + $B_2O_3$ $\leq$ 18.5 mole%.

7. The fibers of claim 6 wherein said oxides meet the following conditions,

A''. $R_2O$ + CaO $\geq$ 21 mole%,
B'. $ZrO_2$ + CaO + $B_2O_3$ $\leq$ 18 mole%, and
C'. the molar ratio of $K_2O$/CaO $\geq$ 0.6.

8. The fibers of claim 3 wherein said glass composition has a liquidus temperature ($T_L$) more than 30° C. below the spinning temperature ($T_F$) at which the glass viscosity is 1,000 poises, said spinning temperature ($T_F$) being not higher than 1,350° C.

9. The fibers of claim 3 wherein said glass composition has a lquidus temperature ($T_L$) more than 50° C. below the spinning temperature ($T_F$) at which the glass viscosity is 1,000 poises, said spinning temperature ($T_F$) being not higher than 1,320° C.

10. The fibers of claim 3 which have a diameter of 5 to 50 microns.

11. A cementitious product reinforced with alkali resistant fibers composed of a glass composition, aid glass composition consisting essentially of

| | |
|---|---|
| $SiO_2$ | 61 - 69 mole%, |
| $ZrO_2$ | 11.5 - 12.5 mole%, |
| CaO | 2 - 5 mole%, |
| $R_2O$ | 16 - 20 mole%, |
| $K_2O$ | 2 - 5 mole%, |
| $B_2O_3$ | 1 - 4 mole%, |
| $P_2O_5$ | substantially 0 |
| $TiO_2$ | 0 - 0.3 mole%, and |
| $M_xO_y$ | 0 - 1 mole% | wherein $R_2O$ represents the total amount of $Na_2O$ and $K_2O$; M is at least one metal selected from the group consisting of V, Cr, Mn, Fe, Co, Cu, Zn, As, Y, Mo, Cd, Sn, Sb, Hf and Ce; $x$ and $y$ are positive integers with the proviso that the valence of M multiplied by $x$ equals $2y$; and the content of fluorides, calculated as $F_2$, is 0 to 1 mole%, and meeting the following conditions, A. $R_2O + CaO \geqq 19$ mole%,
B. $ZrO_2 + CaO + B_2O_3 \leqq 18.5$ mole%, and
C. the molar ratio of $K_2O/CaO \geqq 0.5$.

* * * * *

UNITED STATES PATENT OFFICE
CERTIFICATE OF CORRECTION

Patent No. 4,067,744             Dated January 10, 1978

Inventor(s) Ohtomo, et al.

It is certified that error appears in the above-identified patent and that said Letters Patent are hereby corrected as shown below:

Claim 1, line 16-
    Delete "m"; Insert --M--.
Claim 1, line 19-
    Delete "29"; Insert --19--.
Claim 2, line 4-
    Delete "1 mole%"; Insert --18 mole%--.
Claim 11, line 2-
    Delete "aid"; Insert --said--.

Signed and Sealed this

Fourth Day of July 1978

[SEAL]

Attest:

RUTH C. MASON
Attesting Officer

DONALD W. BANNER
Commissioner of Patents and Trademarks